US007616211B2

(12) United States Patent
Naoi

(10) Patent No.: US 7,616,211 B2
(45) Date of Patent: Nov. 10, 2009

(54) RENDERING PROCESSOR, RASTERIZER AND RENDERING METHOD

(75) Inventor: Junichi Naoi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 325 days.

(21) Appl. No.: 11/302,534

(22) Filed: Dec. 13, 2005

(65) Prior Publication Data

US 2006/0139365 A1 Jun. 29, 2006

(30) Foreign Application Priority Data

Dec. 21, 2004 (JP) .............................. 2004-368813

(51) Int. Cl.
*G09G 5/00* (2006.01)
*G06T 1/00* (2006.01)
*G06T 1/20* (2006.01)
*G06T 15/00* (2006.01)
*G06T 15/50* (2006.01)

(52) U.S. Cl. ........................ 345/582; 345/506; 345/419; 345/426; 345/522

(58) Field of Classification Search ................. 345/506, 345/582, 522, 426, 419
See application file for complete search history.

(56) References Cited

U.S. PATENT DOCUMENTS

| 5,546,530 | A  | * | 8/1996  | Grimaud et al. ............. 345/505 |
| 6,252,608 | B1 | * | 6/2001  | Snyder et al. ............... 345/473 |
| 6,377,265 | B1 | * | 4/2002  | Bong ........................... 345/505 |
| 6,606,415 | B1 |   | 8/2003  | Rao |
| 6,704,018 | B1 |   | 3/2004  | Mori et al. |
| 7,142,215 | B1 | * | 11/2006 | Papakipos et al. ............ 345/506 |
| 2004/0012600 | A1 |   | 1/2004 | Deering et al. |
| 2005/0122337 | A1 | * | 6/2005 | Chen .......................... 345/545 |
| 2006/0132491 | A1 | * | 6/2006 | Riach et al. .................. 345/505 |
| 2008/0055309 | A1 | * | 3/2008 | Ishibashi et al. ............. 345/422 |

OTHER PUBLICATIONS

European Search Report dated Dec. 12, 2008, from the corresponding European Application.
William R. Mark. "Cg: A system for programming graphics hardware in a C-like language" SIGGRAPH, Jul. 31, 2003, retrieved from http://www-csl.csres.utexas.edu/users/billmark/papers/Cg/cgpaper. pdf.

* cited by examiner

*Primary Examiner*—Xiao M Wu
*Assistant Examiner*—Tize Ma
(74) *Attorney, Agent, or Firm*—Katten Muchin Rosenman LLP

(57) ABSTRACT

A shader sends a "completely full" signal to a buffer control unit when a head pixel in a first pass input from a DDA arrives at a final stage of a pipeline process. When the head pixel in the first pass arrives at a stage in the middle of the pipeline process, the shader sends an "almost full" signal to the buffer control unit and a primitive generating unit. Upon receiving the "almost full" signal, the primitive generating unit suspends the generation of rendering primitives in the first pass and starts generating rendering primitives in the second pass. Upon receiving the "almost full" signal, the buffer control unit supplies the rendering primitives in the first pass from the setup processing unit to the DDA via a temporary buffer. Upon receiving the "completely full" signal, the buffer control unit switches to a second pass and directly supplies the rendering primitives in the second pass from the setup processing unit to the DDA.

14 Claims, 11 Drawing Sheets

RENDERING PROCESSOR, RASTERIZER AND RENDERING METHOD

BACKGROUND OF THE INVENTION

1. Field of the Invention

The present invention relates to a rendering processor, a rasterizer and a rendering method for processing rendering data.

2. Description of the Related Art

A rendering engine in three-dimensional computer graphics is evolving into a programmable, processor-like unit in order to address a complex and advanced shading algorithm. Of particular note is that a pixel shader, which represents a core of a rendering engine, is evolving from hardware with preinstalled, fixed graphics functions, into a processor which has a built-in operation unit provided with instruction sets much like those of a CPU and which allows a program to add functions in a flexible manner.

A programmable pixel shader currently in common use performs polygon setup for a three-dimensional object to be rendered, performs an operation on pixel data obtained by rasterizing polygons, and then computes ultimate color values. A method called multipass rendering is used to achieve highly complex shading. A multipass rendering is a method in which a shading process is divided into a plurality of operation passes and a given rendering primitive is subject to a plurality of different operations. As such, multipass rendering is capable of improving the quality of rendering through advanced fine rendering.

In multipass rendering, a rendering process on a given one or more rendering primitive is divided into a plurality of passes. Since an intermediate operation result in a preceding pass is used in a following pass, a buffer for holding the intermediate result is necessary. Since the buffer for holding the intermediate result is limited in its capacity, it is not possible in each pass to process all rendering primitives at a time. To address this, pixels are divided into blocks each comprising a certain number of pixels. The operation is performed block by block in each pass. For example, given that there are passes 1 through n, the operation is started in pass 1 and continued forward. When the operation in pass n is completed, control proceeds to a next block and then the operation is performed similarly in pass 1 through pass n. By repeating this, multipass rendering is performed on the pixel data for all rendering primitives.

As described, multipass rendering requires a buffer for holding the operation result in a preceding pass until the process in a following pass is performed. Control is required to ensure that the number of pixels processed in a pass does not exceed the limit imposed on the capacity of the buffer so as to prevent buffer overflow from occurring. Meanwhile, it is unknown whether the number of pixels reaches the limit imposed on the capacity of the buffer until the rendering primitives have been rasterized. For example, a rendering primitive at a relatively small distance from a viewpoint is drawn on a screen with a relatively large size. Accordingly, the number of pixels is increased after rasterization.

When it is found after rasterization that buffer overflow occurs, control is required to suspend the ongoing process in a pass and prevent any more pixel data from being input to the pass. In this process, a large quantity of pixel data that has already been rasterized is discarded and wasted accordingly. This is due to the fact that rasterization is performed in units of rendering primitives, while the shading process is performed in units of pixels so that whether or not overflow of a buffer required to hold the operation result of each pass occurs is not known unless the number of pixels is known.

Since pass switching control is performed only when it is known after rasterization that buffer overflow occurs. Therefore, much time is required to acquire parameters of rendering primitives in a following pass, generate the rendering primitives, and perform a setup process. As such, pass switching incurs significant overhead so that processing speed in multipass rendering is decreased. Further, those rendering primitives that are not processed due to the overflow require time to repeat rasterization and generation of pixel data when the process in the pass is resumed.

SUMMARY OF THE INVENTION

The present invention has been made in view of the aforementioned problems and relates to a rendering technology capable of efficient multipass rendering.

One embodiment of the present invention relates to a rendering processor for multipass rendering in which a rendering process on rendering primitives are divided into a plurality of operation passes, comprising: a primitive generating unit which generates data related to the rendering primitives processed in each of the operation passes in multipass rendering; a rasterizer which rasterizes the data related to the rendering primitives in each of the operation passes and input from the primitive generating unit so as to sequentially generate pixel data; and a shader which processes the pixel data by executing an instruction in each of the operation passes using a pipeline process. The shader supplies a pass switching signal to the primitive generating unit with a time margin before first pixel data in a current operation pass arrives at a final stage of the pipeline process, and the primitive generating unit is prompted by the receipt of the pass switching signal to suspend the generation of the data related to the rendering primitives in the current operation pass and starts generating the data related to the rendering primitives in a next operation pass.

Another embodiment of the present invention relates to a rasterizer for rasterizing data related to rendering primitives for multipass rendering in which a rendering process on the rendering primitives are divided into a plurality of operation passes, rasterization proceeding in each of the operation passes, comprising: a setup processing unit which sets up parameters related to digital differential analysis for the data related to the rendering primitives in each of the operation passes; a temporary buffer which temporarily holds the data related to the rendering primitives output from the setup processing unit; a digital differential analyzer which transforms the data related to the rendering primitives into pixel data by referring to the parameters related to digital differential analysis; and a buffer control unit which switches between indirect supply using the temporary buffer and direct supply bypassing the temporary buffer, for supply of the data related to the rendering primitives from the setup processing unit to the digital differential analyzer.

Another embodiment of the present invention relates to a rendering method using multipass rendering in which a rendering process on rendering primitives are divided into a plurality of operation passes, comprising: generating data related to the rendering primitives processed in each of the operation passes in multipass rendering; rasterizing the data related to the rendering primitives in each of the operation passes so as to sequentially generate pixel data; and processing the pixel data by executing an instruction in each of the operation passes using a pipeline process. Pass switching control is exercised to suspend the generation of the data related to the rendering primitives in the current operation pass with a time margin before the first pixel data in the current operation pass arrives at a final stage of the pipeline process and to start generating the data related to the rendering primitives in a next operation pass.

Another embodiment of the present invention relates to a rendering method for rasterizing data related to rendering primitives for multipass rendering in which a rendering process on the rendering primitives are divided into a plurality of operation passes, rasterization proceeding in each of the operation passes, comprising: setting up parameters related to digital differential analysis for the data related to the rendering primitives in each of the operation passes; and pixelizing the rendering primitives by referring to the parameters related to digital differential analysis. At the time of switching between operation pass, the data related to the rendering primitives in the current operation pass is buffered before being pixelized, until the parameters related to digital differential analysis for the first rendering primitive in a next operation pass has been set up. At the time of switching between operation passes, the data related to the rendering primitives in the current operation pass buffered may be discarded and the data related to the rendering primitives in the next operation pass may be pixelized without being buffered, when the parameters related to digital differential analysis for the data related to the first rendering primitive in the next operation pass has been set up.

Arbitrary combinations of the aforementioned constituting elements, and implementations of the invention in the form of methods, apparatuses, systems, computer programs and data structures may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
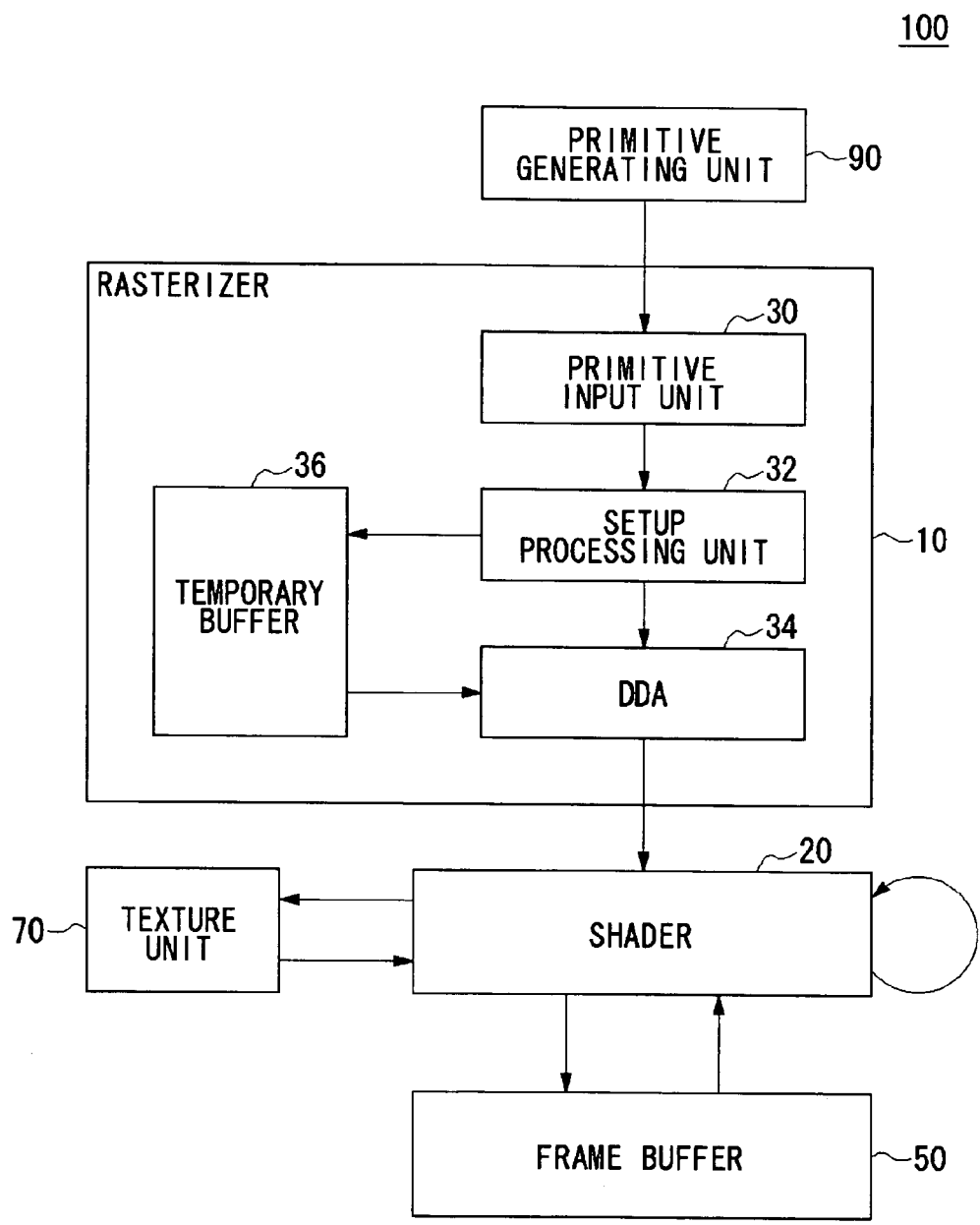
FIG. 1 shows the structure of a rendering processor according to an embodiment of the present invention.

FIG. 1 shows the structure of a rendering processor 100 according to an embodiment of the present invention. The rendering processor 100 performs a rendering process that generates rendering data for two-dimensional on-screen display based on three-dimensional model information. For this purpose, the rendering processor 100 employs the multipass rendering method.

A primitive generating unit 90 generates primitives subject to rendering and supplies the primitives to a rasterizer 10. A rendering primitive is a rendering unit of a geometric form such as point, line, triangle and rectangle in a polygon model representation of a three dimensional object. As such, a rendering primitive is defined by data on a set of vertices. In the figure, the primitive generating unit 90 constitutes a part of the rendering processor 100. Alternatively, the primitive generating unit 90 may be a dedicated processor or a vertex shader generating polygon model information. In another alternative embodiment, the primitive generating unit 90 may be outside the rendering processor 100 and connected to the rendering processor 100 via a network.

The primitive generating unit 90 is provided with the function of suspending the generation of a rendering primitive and resuming the same. The primitive generating unit 90 switches between passes in multipass rendering in accordance with a control signal from the shader 20, by suspending the generation of a rendering primitive in a current pass and starting the generation of a rendering primitive in a following pass. When a cycle of processes in the passes is completed and control is returned to the first pass, generation of rendering primitives is resumed where the generation of a rendering primitive is suspended in the last cycle.

The rasterizer 10 acquires vertex data of a rendering primitive from the primitive generating unit 90 and transforms the rendering primitive into a rendering unit compatible with a screen.

The term "rendering unit" here generally refers to a pixel area of a predetermined size. A rendering unit may be one pixel or a set of multiple pixels. Alternatively, a rendering unit may be a subpixel obtained by dividing a pixel or a set of subpixels. In the following description of an inventive rendering technology, a rendering unit as a whole is regarded as a single pixel even if the rendering unit may actually be comprised of a plurality of pixels or a plurality of subpixels, disregarding pixel by pixel or subpixel by subpixel process inside the rendering unit. Therefore, the "rendering unit" will simply be referred to as a pixel in the following description.

A rendering primitive may be a triangular form. The rasterizer 10 performs view transform by projective transform of a triangle in a three-dimensional space into a triangle on a rendering plane. Further the rasterizer 10 scans the triangle on the rendering plane in the horizontal direction so as to transform, row by row, the triangle into quantized pixels. The rasterizer 10 develops the rendering primitive into pixels. The rasterizer 10 also computes, for each pixel, pixel information including a color value in the RGB format, an alpha value indicating transparency, a z value indicating depth and a UV coordinate value which is a parameter coordinate for referring to texture attribute.

The detailed structure of the rasterizer 10 will be described. A primitive input unit 30 generates a stream that includes vertex coordinates and parameters of rendering primitives received from the primitive generating unit 90. The primitive input unit 30 supplies the stream to a setup processing unit 32. The setup processing unit 32 sets up various parameters for processing the rendering primitive stream in a digital differential analyzer (DDA). More specifically, the setup processing unit 32 sets up a boundary box for marking a boundary in a space that includes a rendering primitive or sets up various parameters such as edge coefficients for DDA processing.

The setup processing unit 32 either buffers set up primitive data in a temporary buffer 36 or directly supplies the same to a DDA 34. The rendering primitive data is supplied by the setup processing unit 32 to the DDA 34 in a mode selected from a "direct supply mode", in which rendering primitives are not buffered in the temporary buffer 36 but directly supplied to the DDA 34, and a "indirect supply mode", in which rendering primitives are temporarily buffered in the temporary buffer 36 before being supplied to the DDA 34 in the FFIO order.

The temporary buffer 36 is a first-in first-out (FIFO) buffer for temporarily storing rendering primitives output by the setup processing unit 32. The capacity of the temporary buffer 36 is sufficient to store rendering primitives output from the setup processing unit 32 in a period between the suspension of the input of rendering primitives by the primitive generating unit 90 and the completion of the setup process on the rendering primitive input immediately before the suspension.

The DDA 34 subjects rendering primitives output from the temporary buffer 36 the FIFO order or rendering primitives supplied directly from the setup processing unit 32 to a DDA process in accordance with various parameters set up by the setup processing unit 32. In this way, the DDA 34 transforms the primitives into pixel data. The DDA 34 supplies the pixel data for the rendering primitives to the shader 20.

Generally, the larger the surface area of a rendering primitive input to the DDA 34, the larger the number of pixels in the rendering primitive pixelized. When a rendering primitive is at a relatively small distance from a viewpoint and it is necessary to render the rendering primitive in great detail, the number of pixels generated from the rendering primitive is increased. In the setup processing unit 32, a rendering primitive is represented by vertex data so that the data volume thereof is relatively small. Once the rendering primitive is pixelized by the DDA 34, the number of pixels is increased and the data volume is increased as well. Since the number of pixels generated varies with the surface area and the required detail level, the number of pixels is not known until after the DDA process is completed.

The shader 20 performs a shading process based on the pixel information computed by the rasterizer 10 so as to determine the color values of the pixels. If texture mapping is to be performed, the shader 20 incorporates the color values of a texture obtained from a texture unit 70 so as to compute the ultimate color values of the pixels. The shader 20 writes the pixel data in a frame buffer 50.

The texture unit 70 maps texture data to pixels processed by the shader 20. The position of a texture mapped to pixels on a polygon surface is indicated in a UV coordinate system, a two-dimensional parameter coordinate system. The texture unit 70 acquires from the shader 20 the UV coordinate values of a texture mapped to pixels. After transforming the UV coordinate values into reference addresses, the texture unit 70 acquires, from the texture, color values corresponding to the reference addresses and then supplies the color values to the shader 20.

The shader 20 further performs processes like fogging and alpha blending on the rendering data held in the frame buffer 50 so as to determine the ultimate color values of the pixels and updates the pixel data in the frame buffer 50 accordingly.

The shader 20 employs pipeline processing to execute a shading program. The shader 20 is provided with a mechanism for feeding back the result of operation in the pipeline process to an arbitrary stage in the pipeline. This feedback loop is taken advantage of in multipass rendering. For example, an operation result in a preceding pass may be delivered to a following pass to draw over an existing pixel.

The frame buffer 50 is a buffer for storing pixel data generated by the shader 20 in a screen coordinate system. The pixel data stored in the frame buffer 50 may represent an ultimate image rendered or an intermediate image in the process of shading. The pixel data stored in the frame buffer 50 is output to a display apparatus for display.

Figure 2:
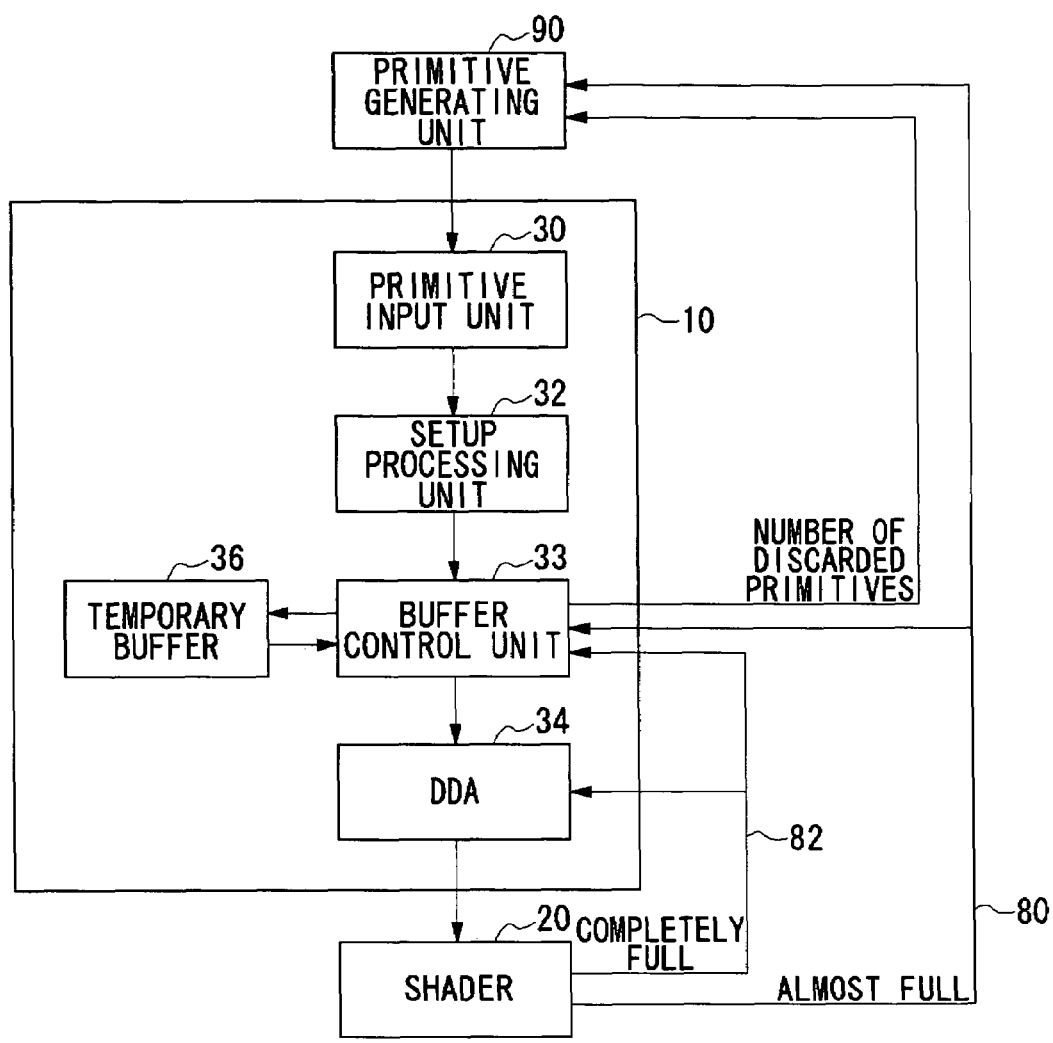
FIG. 2 shows a control mechanism for rasterization in the rasterizer of FIG. 1.

FIG. 2 shows a control mechanism for rasterization in the rasterizer 10. A buffer control unit 33 (not shown in FIG. 1) is provided at the backend of the setup processing unit 32. The buffer control unit 33 controls the supply of rendering primitive data output from the setup processing unit 32 to the DDA 34.

The buffer control unit 33 switches between an operation in which the buffer control unit 33 directly supplies the rendering primitive data output from the setup processing unit 32 to the DDA 34, bypassing the temporary buffer 36, and an operation in which the buffer control unit 33 indirectly supplies the data to the DDA 34, buffering the data in the temporary buffer 36. The buffer control unit 33 normally operates in the direct supply mode and operates in the indirect supply mode when pass switching occurs.

As indicated by reference numeral 82, the shader 20 feeds a "completely full" signal to the buffer control unit 33 and the DDA 34 when the first pixel data (hereinafter, referred to as a head pixel) in the first pass input from the rasterizer 10 is past the final stage of the pixel pipeline process and output to the frame buffer 50.

As indicated by reference numeral 80, the shader 20 also feeds an "almost full" signal to the buffer control unit 33 and the primitive generating unit 90 when time is not yet right for the "complete full" signal but the head pixel arrives at a middle stage of the pixel pipeline process. That is, the shader 20 issues the "almost full" signal with a certain time margin before the head pixel reaches the final stage of the pixel pipeline process, permitting the issuance of the "completely full" signal. The time margin between the issuance of the "almost full" signal and the issuance of the "completely full" signal will be referred to as "slack time".

The slack time is configured to be equal to a latency period between the start of generation of a rendering primitive in the primitive generating unit 90 and a point of time immediately before that rendering primitive is input to the DDA process. Time for the primitive generating unit 90 to generate a rendering primitive, time for the primitive input unit 30 to generate a rendering primitive stream and time for the setup processing unit 32 to set up the rendering primitive are each determined depending on hardware structure. Therefore, the slack time can be preset by computation.

The number of remaining stages in the pixel pipeline process counted from the final stage of the pixel pipeline process is determined in accordance with the slack time such that time required for the head pixel to pass the process in the remaining stages in the pixel pipeline process is equal to the slack time. Since the throughput of the pixel pipeline process is determined by the hardware structure of the shader 20, the number of remaining stages can be preset.

The shader 20 issues the "almost full" signal when the head pixel arrives at a position removed from the final stage of the pixel pipeline process by the number of remaining stages (such a position will be referred to as a "critical point"). A control point may be provided at a position in the shader program corresponding to the critical point in the pixel pipeline process and an instruction for issuing the "almost full" signal may be inserted. With this, the shader 20 is capable of issuing the "almost full" signal when the process of the head pixel passes the control point in the shader program.

By defining the slack time and setting up the critical point in the pixel pipeline process, it is ensured that a period of time between the arrival of the head pixel at the critical point in the pixel pipeline process and the output thereof past the final stage of the pixel pipeline process is practically equal to a period of time between the start of generation of a rendering primitive by the primitive generating unit 90 and a point of time immediately prior to the input of the rendering primitive to the DDA process. With this, it is guaranteed that the DDA process is not halted and is executed continuously at the time of pass switching.

Upon receiving the "almost full" signal from the shader 20, the primitive generating unit 90 immediately suspends the generation of a rendering primitive being processed in the first pass, making a transition to the second pass to start generating rendering primitives in the second pass. Thus, the "almost full" signal functions to direct the primitive generating unit 90 to switch from a pass to another.

Upon receiving the "almost full" signal from the shader 20, the buffer control unit 33 switches to the indirect supply operation in which the buffer control unit 33 supplies the rendering primitive data in the first pass output from the setup processing unit 32 to the DDA 34 via the temporary buffer 36. After confirming that the head pixel in the first pass actually arrives at the final stage of the pipeline process in the shader 20 by receiving the "completely full" signal from the shader 20, the buffer control unit 33 switches to the second pass and switches to the direct supply operation in which the buffer control unit 33 directly supplies the rendering primitive data in the second pass output from the setup processing unit 32 to the DDA 34. When the rendering primitive data in the first pass remains in the temporary buffer 36 in a switch from the indirect supply operation to the direct supply operation, the buffer control unit 33 discards the remaining data and notifies the primitive generating unit 90 of the number of discarded rendering primitives in the first pass.

The DDA 34 is provided with the function of suspending and resuming the DDA process. Upon receiving the "completely full" signal from the shader 20, the DDA 34 immediately suspends the DDA process in the first pass and stores the pixel position of the rendering primitive suspended. When the process in the first pass is resumed, the DDA 34 resumes the DDA process at the position of suspension. The DDA 34 is required to store the position of resumption and the position of suspension corresponding to the beginning and end of the DDA process, respectively. When the process is resumed, the DDA 34 receives, from the buffer control unit 33, a resumption signal as well as parameter coefficients set up by the setup processing unit 32. The DDA 34 then resumes the DDA process at the position of previous suspension and copies the position of suspension to the position of resumption.

After suspending the DDA process in the first pass in response to the "completely full" signal, the DDA 34 immediately receives the supply of the first rendering primitive in the second pass from the buffer control unit 33 so as to start the process in the second pass. Thus, the "completely full" signal functions as a pixel input suspension signal to direct the DDA 34 to suspend the DDA process in the first pass, suspend the input of the pixel in the first pass, and switch to the DDA process in the second pass.

As described, according to the embodiment, pass switching control is exercised in accordance with the two signals issued by the shader 20, i.e., the "almost full" signal and the "completely full" signal. Prompted by the issuance of the "almost full" signal, the generation of rendering primitives in the second pass and the associated setup process are started in advance. When the head pixel in the first pass passes the final stage of the pipeline process in the shader 20 and is output to the frame buffer 50, permitting the "completely full" signal to be issued, the setup processing unit 32 will have completed the setup process of the first rendering primitive in the second pass. Accordingly, when switching from the first pass to the second pass occurs, the DDA 34 can start rasterizing rendering primitives in the second pass immediately after suspending rasterizing rendering primitives in the first pass. The DDA process is not halted before and after the pass switching.

When the DDA 34 has pixelized the first rendering primitive in the second pass and supplies the same to the shader 20, the shader 20 has already output the result of the process in the first pass. Therefore, the shader 20 is capable of using the result of the process in the first pass fed back to the shader 20, in executing the operation in the second pass. The feedback loop allows the shader 20 to directly take advantage of the intermediate result in a preceding pass in executing the operation in a following pass, without using, for example, an intermediate buffer. It can be said that the shader 20 itself functions as a buffer for holding the intermediate result of the preceding pass. The shader 20 is viewed as a buffer and this is the reason why the passage of the head pixel in the first pass through the critical point in the middle of the pixel pipeline process in the shader 20 is referred to as "almost full" and the passage of the head pixel through the final stage is referred to as "completely full".

By configuring the buffer control unit 33 to switch to the indirect supply operation when switching from the first pass to the second pass takes place, rendering primitives in the first pass output from the setup processing unit 32 can be temporarily saved in the temporary buffer 36 even when the shading process in the first pass performed by the shader 20 takes time so that the pixel data remains unprocessed in the DDA 34. With this, the setup processing unit 32 can proceed to set up rendering primitives in the second pass in advance, after outputting rendering primitives in the first pass. The setup processing unit 32 can directly supply rendering primitives in the second pass to the DDA 34 immediately after control is switched to the second pass. Accordingly, when switching from the first pass to the second pass takes place, the supply of rendering primitives in the first pass to the DDA 34 and the supply of rendering primitives in the second pass to the DDA 34 can proceed without any interruption in between.

Figure 3:
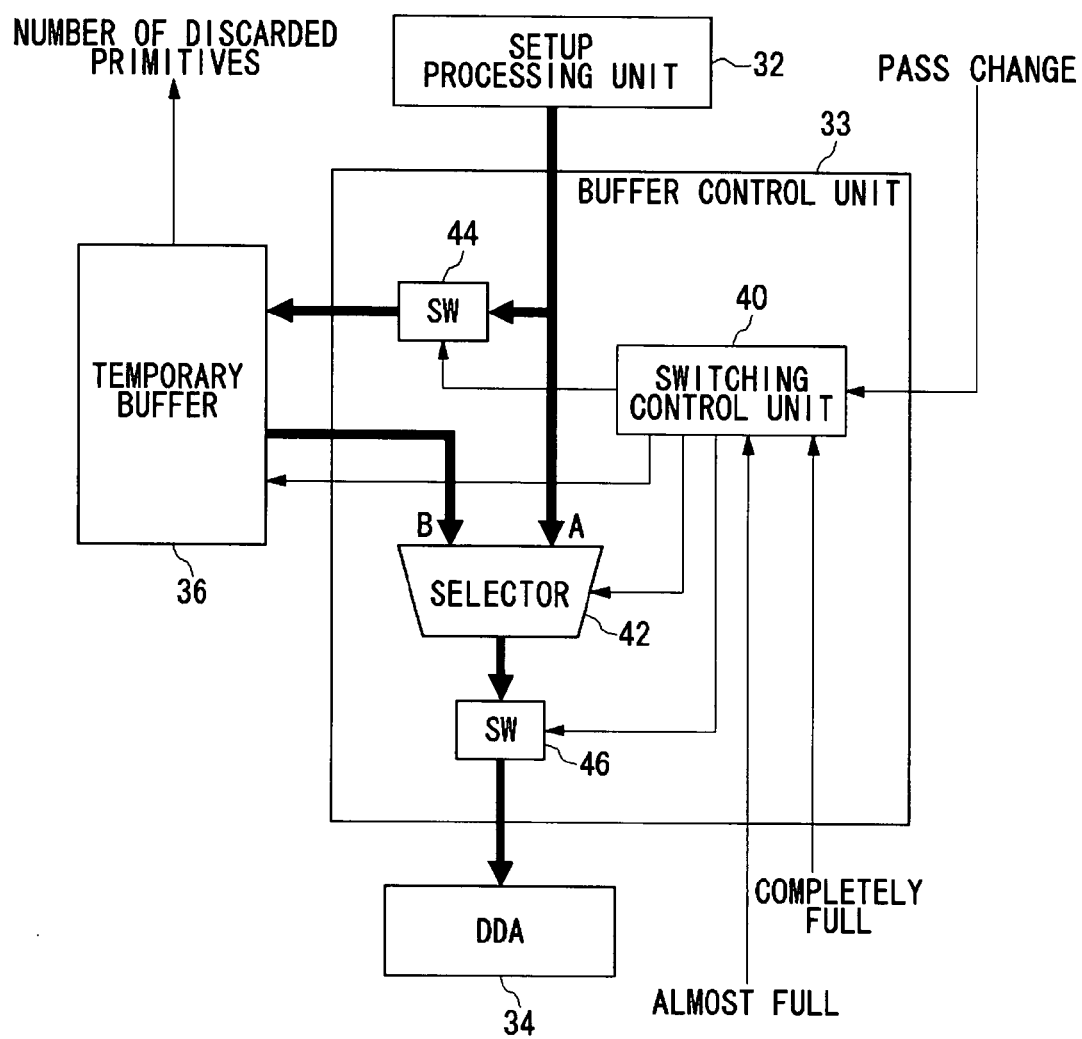
FIG. 3 shows the detailed structure of the buffer control unit of FIG. 2.

FIG. 3 shows the detailed structure of the buffer control unit 33. The buffer control unit 33 includes a switching control unit 40, a selector 42, a first switch 44 and a second switch 46.

The switching control unit 40 supplies control signals to the selector 42, the first switch 44, the second switch 46 and the temporary buffer 36 in order to switch between routes of supply of rendering primitives from the setup processing unit 32 to the DDA 34.

When turned on by the control signal from the switching control unit 40, the first switch 44 and the second switch 46 output the input data to the subsequent stage. When turned off, the switches do not output the input data to the subsequent stage. The first switch 44 is provided between the setup processing unit 32 and the temporary buffer 36. The first switch 44 outputs the rendering primitive data input from the setup processing unit 32 to the temporary buffer 36 only when the first switch 44 is turned on. The second switch 46 is provided between the selector 42 and the DDA 34. The second switch 46 outputs the rendering primitive data input from the selector 42 to the DDA 34 only when the second switch 46 is turned on.

In accordance with the control signal from the switching control unit 40, the selector 42 switches to a first input A or a second input B and outputs the input data to the second switch 46. The rendering primitive data output from the setup processing unit 32 is fed to the first input A of the selector 42. The rendering primitives buffered in the temporary buffer 36 is retrieved in the FIFO order and fed to the second input B.

The switching control unit 40 receives the "completely full" signal and the "almost full" signal from the shader 20. After the primitive generating unit 90 switches from a pass to another, causing a rendering primitive stream in the new pass to be input to the setup processing unit 32, and when the setup processing unit 32 has completed setting up the first rendering primitive in the new pass, a "pass change" signal is supplied from the setup processing unit 32 to the switching control unit 40. The "pass change" signal indicates that the rendering primitive in the second pass is ready for input to the DDA 34.

For supply of rendering primitives output from the setup processing unit 32, the switching control unit 40 selects the direct supply mode for direct supply to the DDA 34 or the indirect supply mode for indirect supply via the temporary buffer 36, in accordance with whether each of the "complete full", "almost full" and "pass change" signals is asserted. In order to implement the selected mode, the switching control unit 40 supplies the control signals to the selector 42, the first switch 44, the second switch 46 and the temporary buffer 36.

When the switching control unit 40 has not received any of the "completely full", "almost full" and "pass change" signals, the switching control unit 40 sets up the normal direct supply mode. In the case of direct supply mode, the switching control unit 40 turns the first switch 44 off and controls the rendering primitive data output from the setup processing unit 32 not to be buffered in the temporary buffer 36 but to be fed to the first input A of the selector 42. The switching control unit 40 switches to the first input A of the selector 42 and turns the second switch 46 on. With this, the rendering primitive data output from the setup processing unit 32 is supplied to the DDA 34 via the selector 42 and the second switch 46.

Upon receiving the "almost full" signal, the switching control unit 40 sets up the indirect supply mode. In the case of indirect supply mode, the switching control unit 40 turns the first switch 44 on and controls rendering primitives output from the setup processing unit 32 to be buffered in the temporary buffer 36. The switching control unit 40 also switches to the second input B of the selector 42 and turns the second switch 46 on. With this, the rendering primitive buffered in the temporary buffer 36 is retrieved in the FIFO order and supplied to the DDA 34 via the selector 42 and the second switch 46.

When switching to a new pass takes place, the switching control unit 40 supplies a reset signal to the temporary buffer 36 to discard rendering primitives in the old pass buffered in the temporary buffer 36. Upon receiving the reset signal, the temporary buffer 36 discards rendering primitives in the old pass currently held therein so as to clear the temporary buffer 36. In resuming the process in the old pass, the primitive input unit 30 is required to go back a number of steps commensurate with the number of discarded rendering primitives before generating rendering primitives. For this purpose, the temporary buffer 36 sends the number of discarded rendering primitives to the primitive input unit 30.

The procedure for rendering by the rendering processor 100 with the above-described structure will be described with reference to the flowcharts of FIGS. 4 and 5 and the control operation shown in FIGS. 6-10.

Figure 4:
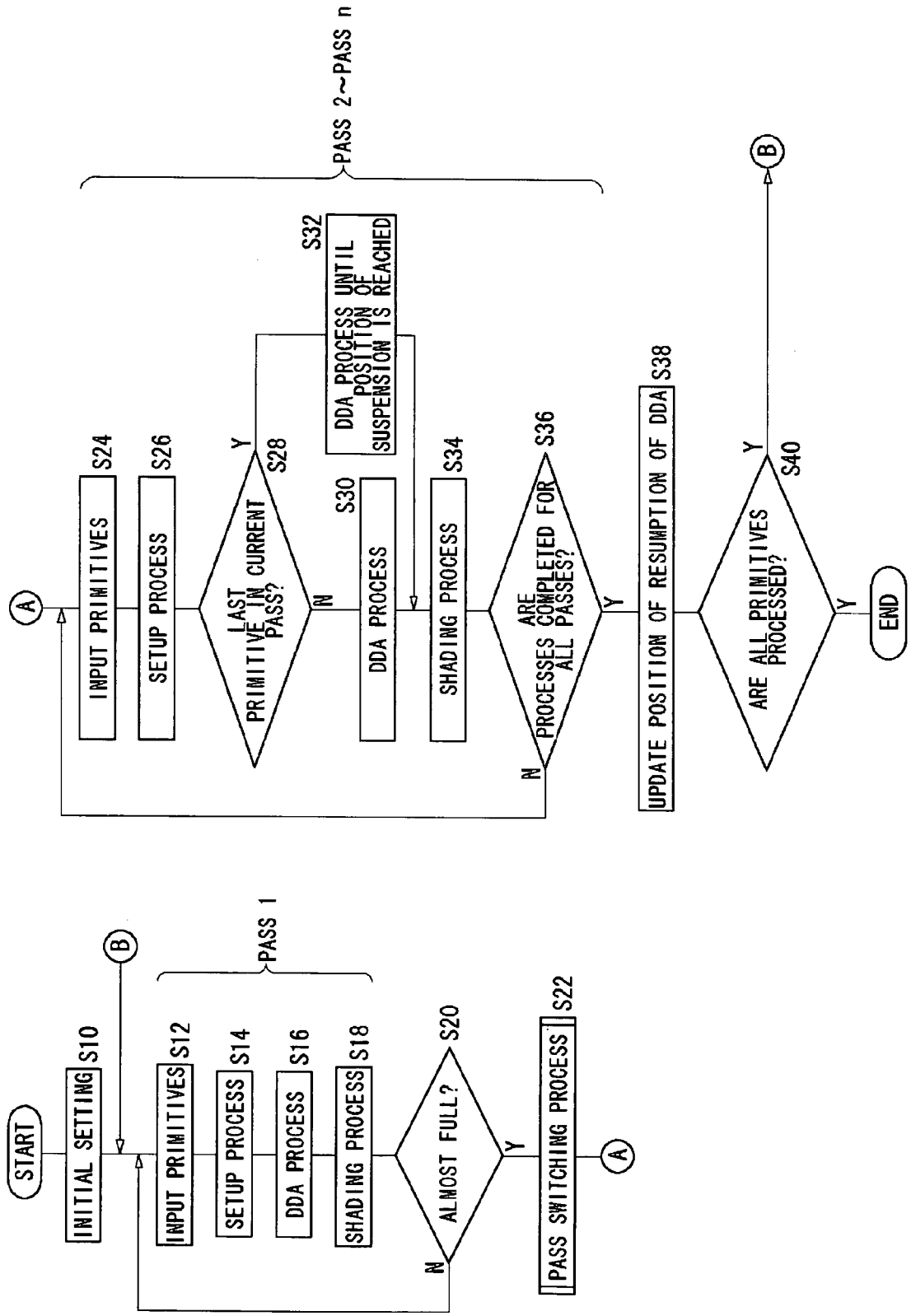
FIG. 4 is a flowchart showing a procedure for multipass rendering.

FIG. 4 is a flowchart showing a procedure for multipass rendering. It will be assumed the shading program is divided into a total of n passes consisting of first through nth passes. In starting the process in the first pass, the rasterizer 10 is reverted to an initial setting (S10). More specifically, the temporary buffer 36 is cleared and the position of resumption and the position of suspension of pixelization stored in the DDA 34 are initialized.

The primitive generating unit 90 generates rendering primitives in the first pass. The primitive input unit 30 inputs the rendering primitive stream in the first pass to the setup processing unit 32 (S12). The setup processing unit 32 performs a setup process to subject rendering primitives in the first pass to the DDA process (S14).

In the process in the first pass, the buffer control unit 33 operates in the normal direct supply mode until it receives the "almost full" signal from the shader 20. The rendering primitive data output from the setup processing unit 32 is directly supplied to the DDA 34.

Figure 6:
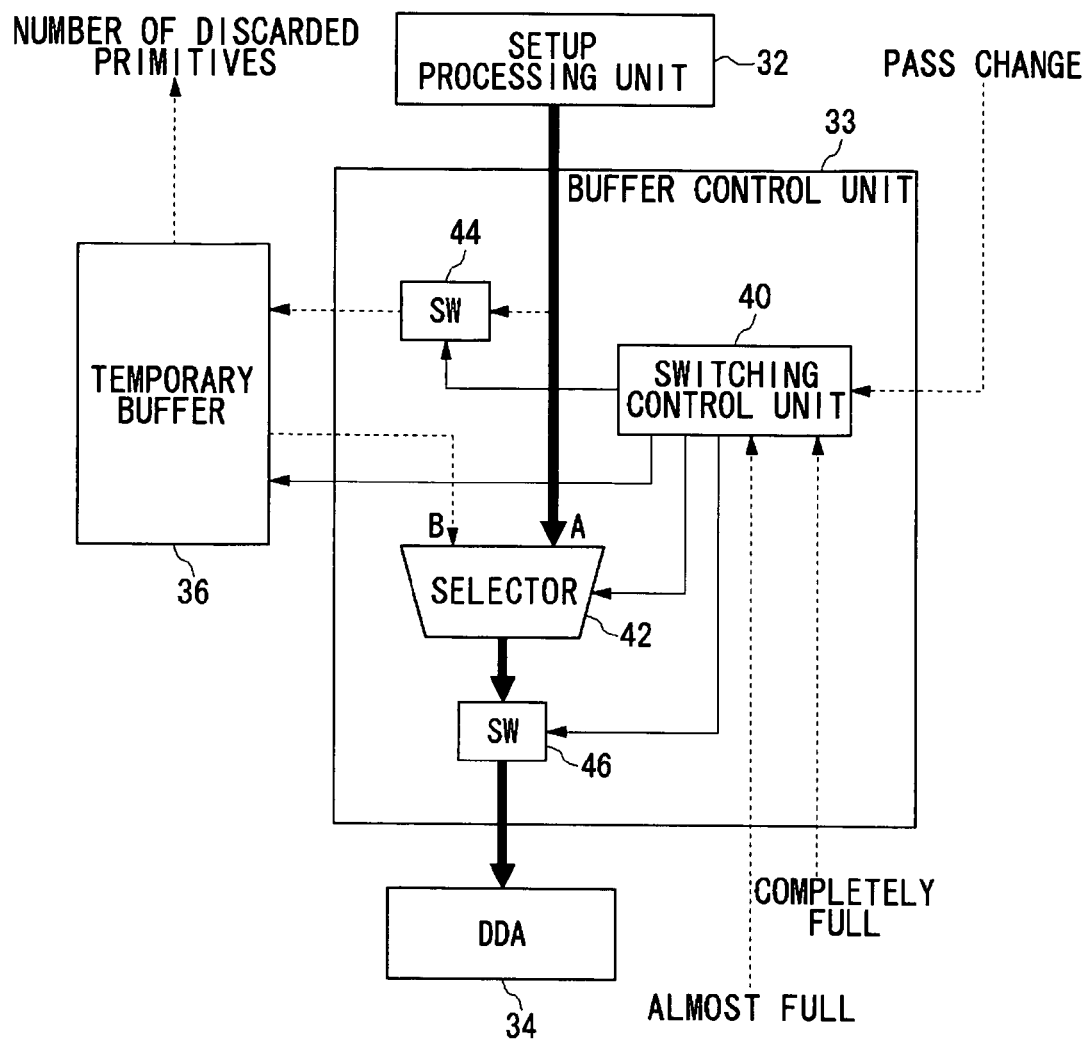
FIG. 6 shows direct supply operation by the buffer control unit of FIG. 3.

FIG. 6 shows the direct supply operation by the buffer control unit 33. The switching control unit 40 has not received any of the "completely full", "almost full" and "pass change" signals. To implement the direct supply mode, the switching control unit 40 turns the first switch 44 off, switches to the first input A of the selector 42 and turns the second switch 46 on. With this, the rendering primitive data in the first pass output from the setup processing unit 32 is directly supplied to the DDA 34 via the selector 42 and the second switch 46, without being buffered in the temporary buffer 36.

Referring to FIG. 4, the DDA 34 subjects to the DDA process rendering primitives in the first pass set up by the setup processing unit 32, transforming the rendering primitives into the pixel data and supplying the same to the shader 20 (S16). The shader 20 performs a shading process in the first pass based on the pixel data generated by the DDA 34 (S18).

When the head pixel in the first pass arrives at the critical point in the pipeline process, the shader 20 supplies the "almost full" signal to the primitive generating unit 90 and the buffer control unit 33. Upon receiving the "almost full" signal, the primitive generating unit 90 suspends the process in the first pass and switches to the second pass. Upon receiving the "almost full" signal from the shader 20 (Y in S20), the buffer control unit 33 performs a pass switching process described later (S22). If the "almost full" signal is not received from the shader 20 (N in S20), the buffer control unit 33 continues the process in the first pass beginning with the input of rendering primitives in step S12 and ending with the shading process in step S18.

Figure 5:
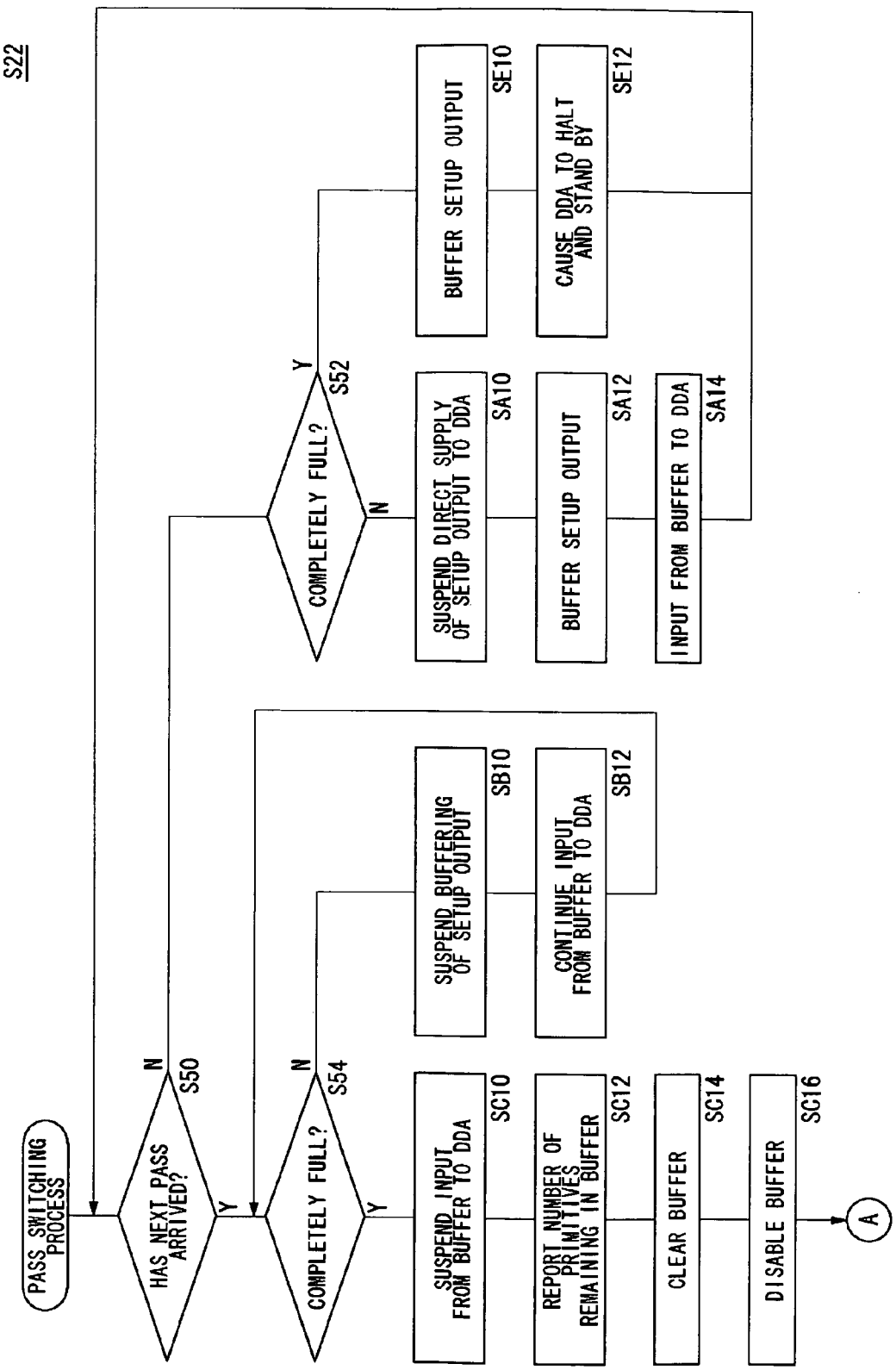
FIG. 5 is a flowchart showing the detailed procedure for pass switching of FIG. 4.

FIG. 5 is a flowchart showing a detailed procedure for pass switching of step S22. When switching from the first pass to the second pass takes place, the buffer control unit 33 uses buffering to exercise transitional control so that rendering primitives in the first pass are not discarded in a wasteful manner and the rendering primitive data continues to be supplied to the DDA 34 without any interruption occurring when switching from the first pass to the second pass takes place.

The buffer control unit 33 determines whether it receives the "pass change" signal from the setup processing unit 32 (S50). The primitive generating unit 90 starts generating rendering primitives in the second pass in response to the "almost full" signal from the shader 20. A certain period of processing time is required before a rendering primitive stream in the second pass is input to the setup processing unit 32 and the first rendering primitive data in the second pass is set up for output. The buffer control unit 33 determines that the setup of the first rendering primitive in the second pass is completed by receiving the "pass change" signal from the setup processing unit 32.

If the "pass change" signal is not received yet (N in S50), the buffer control unit 33 then determines whether it received the "completely full" signal (S52). If the "completely full" signal is not received (N in S52), the buffer control unit 33 supplies the rendering primitive data in the first pass according to the indirect supply operation in steps SA10 through SA14.

The buffer control unit 33 suspends the direct supply to the DDA 34 of the rendering primitive data in the first pass output from the setup processing unit 32 (SA10). The buffer control unit 33 buffers the rendering primitive data in the first pass output from the setup processing unit 32 in the temporary buffer 36 (SA12). The buffer control unit 33 retrieves the rendering primitive data in the first pass buffered in the temporary buffer 36 in the FIFO order and inputs the retrieved data to the DDA 34 (SA14).

Figure 7:
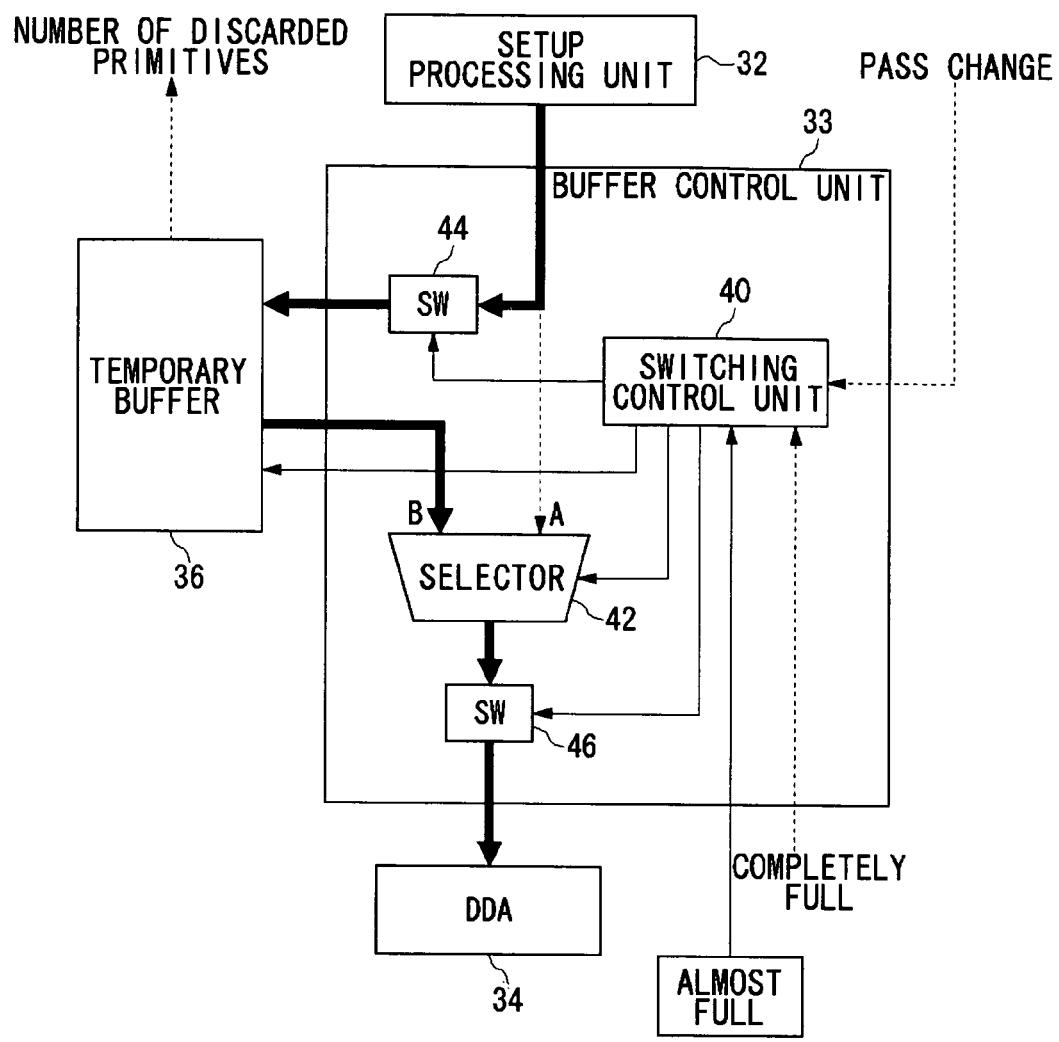
FIG. 7 shows indirect supply operation performed by the buffer control unit of FIG. 3.

FIG. 7 shows the indirect supply operation in steps SA10 through SA14 performed by the buffer control unit 33. The switching control unit 40 only receives the "almost full" signal from the shader 20 and has not received the "pass change" signal from the setup processing unit 32. In this state, the primitive generating unit 90 has received the "almost full" signal and switched from the first pass to the second pass so as to start generating rendering primitives in the second pass, but the setup process on rendering primitives in the first pass is continuing in the setup processing unit 32.

In this state, the switching control unit 40 turns the first switch 44 on so as to buffer in the temporary buffer 36 the rendering primitive data in the first pass output from the setup processing unit 32. The switching control unit 40 controls the temporary buffer 36 so that the rendering primitive data in the first pass buffered in the temporary buffer 36 is retrieved in the FIFO order and fed to the second input B of the selector 42. The switching control unit 40 also switches to the second input B of the selector 42. With this, the direct supply to the DDA 34 of the rendering primitive data in the first pass output from the setup processing unit 32 as shown in FIG. 6 is suspended. The rendering primitive data in the first pass output from the setup processing unit 32 is temporarily buffered in the temporary buffer 36 before being supplied to the DDA 34 via the selector 42 and the second switch 46.

Referring to FIG. 5, if the buffer control unit 33 acknowledges in step S50 the completion of setup of the first rendering primitive in the second pass by receiving the "pass change" signal (Y in S50), the buffer control unit 33 then determines whether it received the "completely full" signal (S54). If the "completely full" signal is not received yet (N in S54), the buffer control unit 33 performs a transitional operation in steps SB10 through SB12 for supplying rendering primitives in the first pass buffered in the temporary buffer 36 to the DDA 34 until the "completely full" signal is received.

The buffer control unit 33 suspends the operation of buffering in the temporary buffer 36 the rendering primitive in the first pass output from the setup processing unit 32 (SB10). Meanwhile, the buffer control unit 33 continues the operation of retrieving the rendering primitive data in the first pass buffered in the temporary buffer 36 in the FIFO order and inputting the retrieved data to the DDA 34 (SB12).

Figure 8:
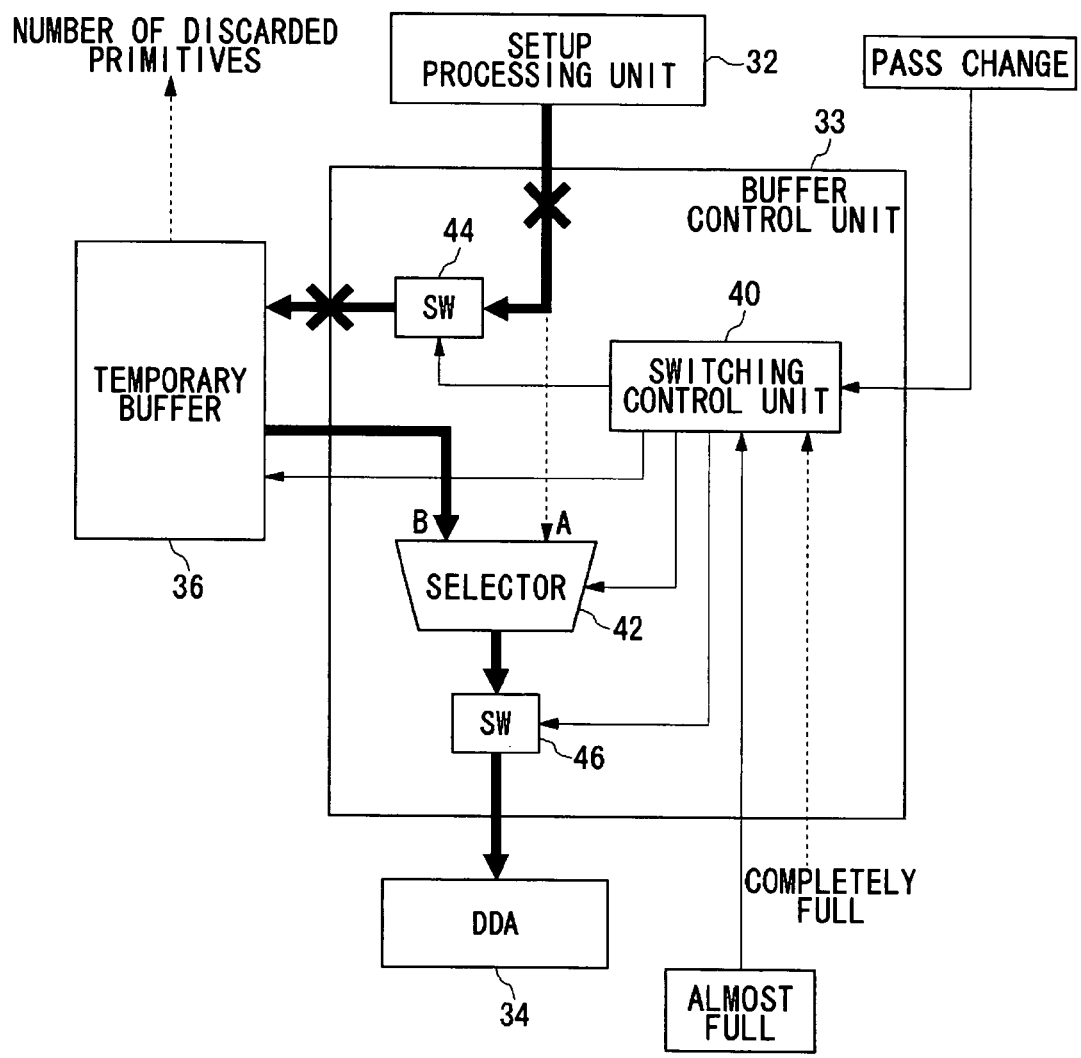
FIG. 8 shows transitional operation performed by the buffer control unit of FIG. 3.

FIG. 8 shows the transitional operation in steps SB10 through SB12 performed by the buffer control unit 33. The switching control unit 40 has received the "almost full" signal and the "pass change" signal but has not received the "completely full" signal. The switching control unit 40 suspends the buffering, in the temporary buffer 36, of the rendering primitive data output from the setup processing unit 32 as shown in FIG. 7, by turning the first switch 44 off. This is because the setup processing unit 32 is ready to output the first rendering primitive data in the second pass.

Meanwhile, the switching control unit 40 maintains the selector 42 in the state of FIG. 7. By allowing the data fed to the second input B of the selector 42 to be output, the rendering primitive data in the first pass buffered in the temporary buffer 36 continues to be retrieved in the FIFO order and supplied to the DDA 34 via the selector 42 and the second switch 46. With this, the rendering primitive data in the second pass is not buffered in the temporary buffer 36 and the rendering primitive data in the first pass buffered in the temporary buffer 36 continues to be supplied to the DDA 34. Described above is the transitional operation performed until the switching control unit 40 receives the "completely full" signal.

Referring to FIG. 5, if the buffer control unit 33 receives the "completely full" signal in step S54 (Y in S54), the buffer control unit 33 performs a buffer clear operation in steps SC10 through SC16 for suspending the supply of the rendering primitive data in the first pass.

The buffer control unit 33 suspends the supply to the DDA 34 of the rendering primitive data in the first pass buffered in the temporary buffer 36 (SC10). The buffer control unit 33 notifies the primitive generating unit 90 of the number of rendering primitives in the first pass which remain in the temporary buffer 36 at that point of time (SC12). The buffer control unit 33 clears the temporary buffer 36 by sending a reset signal to the temporary buffer 36 and discards the remaining rendering primitive data in the first pass (SC14). The buffer control unit 33 disables the temporary buffer 36 in proceeding with the process in the second and subsequent passes (SC16). After disabling the temporary buffer 36, the buffer control unit 33 switches to the first input A of the selector 42, reverting to the normal direct supply mode.

Figure 9:
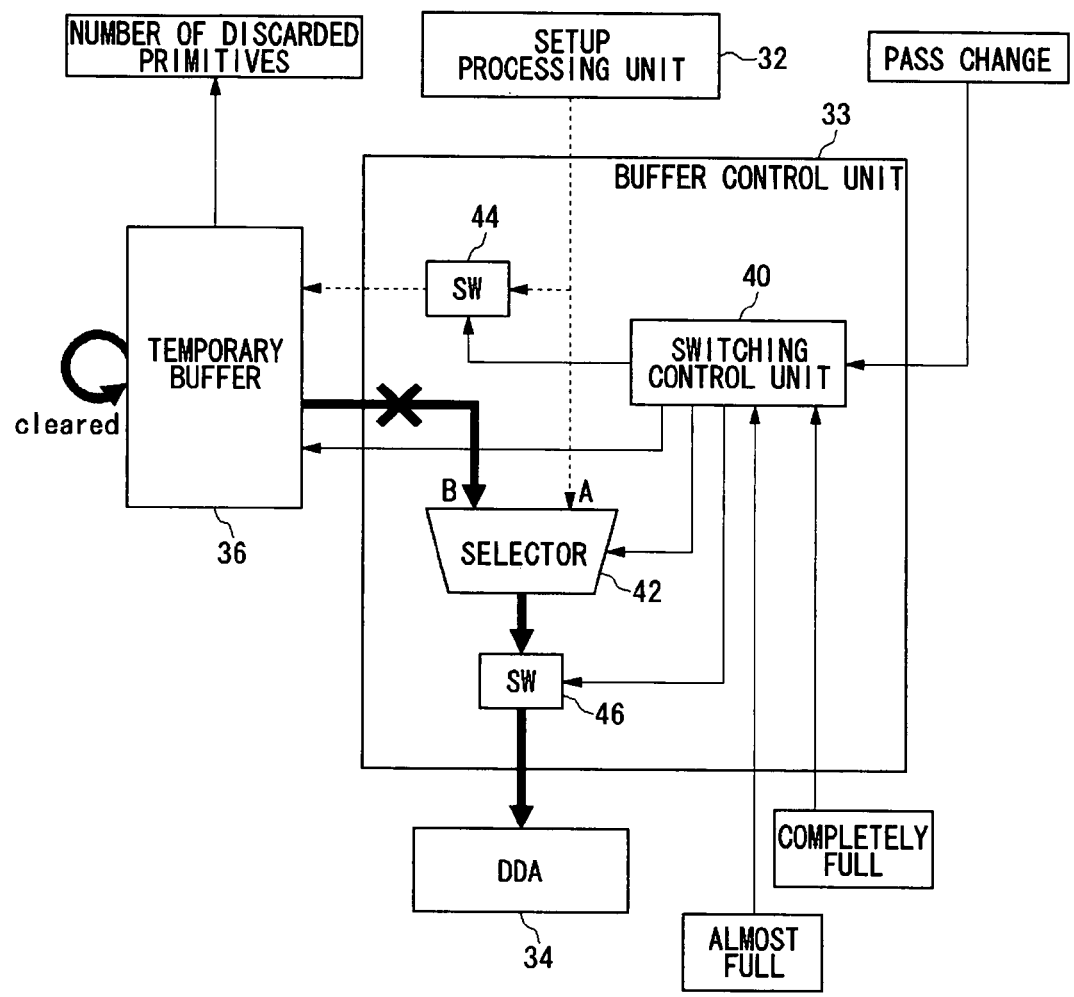
FIG. 9 shows buffer clear operation performed by the buffer control unit of FIG. 3.

FIG. 9 shows the buffer clear operation in steps SC10 through SC16 performed by the buffer control unit 33. The switching control unit 40 has received the "almost full" signal, the "pass change" signal and the "completely full" signal. Since the "completely full" signal is received, the shader 20 has completed the pipeline process on the head pixel in the first pass and is ready to start the operation in the second pass.

The switching control unit 40 controls the temporary buffer 36 so as to suspend the supply to the DDA 34 of the rendering primitive data in the first pass buffered in the temporary buffer 36 as shown in FIG. 8. The number of rendering primitives in the first pass that remain in the temporary buffer 36 at this point of time is reported to the primitive generating unit 90 as the number of discarded primitives. The temporary buffer 36 is cleared by a reset instruction from the switching control unit 40. The switching control unit 40 switches to the first input A of the selector 42. With this, the supply to the DDA 34 of the rendering primitive data in the first pass is suspended. Thereafter, control is returned to the state of FIG. 6 so that the rendering primitive data in the second pass output from the setup processing unit 32 is directly supplied to the DDA 34 via the selector 42 and the second switch 46.

As described above, switching from the first pass to the second pass normally proceeds as follows. The direct supply operation of FIG. 6 is switched to the indirect supply operation of FIG. 7, whereupon the transitional operation of FIG. 8 and the buffer clear operation of FIG. 9 are performed before control is returned to the direct supply operation of FIG. 6. However, the processing time in the primitive input unit 30, the rasterizer 10 and the shader 20 is not necessarily constant. An exceptional event may occur. Of particular note is that the shader 20 operates in cooperation with the texture unit 70 so that time consumed for pixel processing may be extended depending on time consumed for texture mapping, causing the processing time to become uncertain. An operation to handle an exception occurring in pass switching will be described by referring to FIG. 5 and FIG. 10.

Referring to FIG. 5, a description will be given of a case where the buffer control unit 33 has not received the "pass change" signal (N in S50) and has received the "completely full" signal (Y in S52). This is a state in which the head pixel in the first pass is past the final stage of the pixel pipeline process in the shader 20 and the shader 20 is ready to start the process in the second pass, but the setup of the first rendering primitive in the second pass is not completed. It is an exceptional state in which it is impossible to input the rendering primitive data in the second pass to the DDA 34, causing the DDA 34 to be in a standby state with its operation being halted. At this point of time, the shader 20 is forced to suspend its pixel pipeline process, creating a free time called "bubble" in the pipeline process.

In this exceptional state, the buffer control unit 33 performs an exception handling operation in steps SE10 through SE12. The buffer control unit 33 saves the rendering primitive data in the first pass that continues to be output from the setup processing unit 32 in the temporary buffer 36 (SE10). Since the buffer control unit 33 has received the "completely full" signal, the buffer control unit 33 halts the operation of the DDA 34, placing it in a standby state so that the rendering primitive data in the first pass buffered in the temporary buffer 36 is not supplied to the DDA 34 any more.

Figure 10:
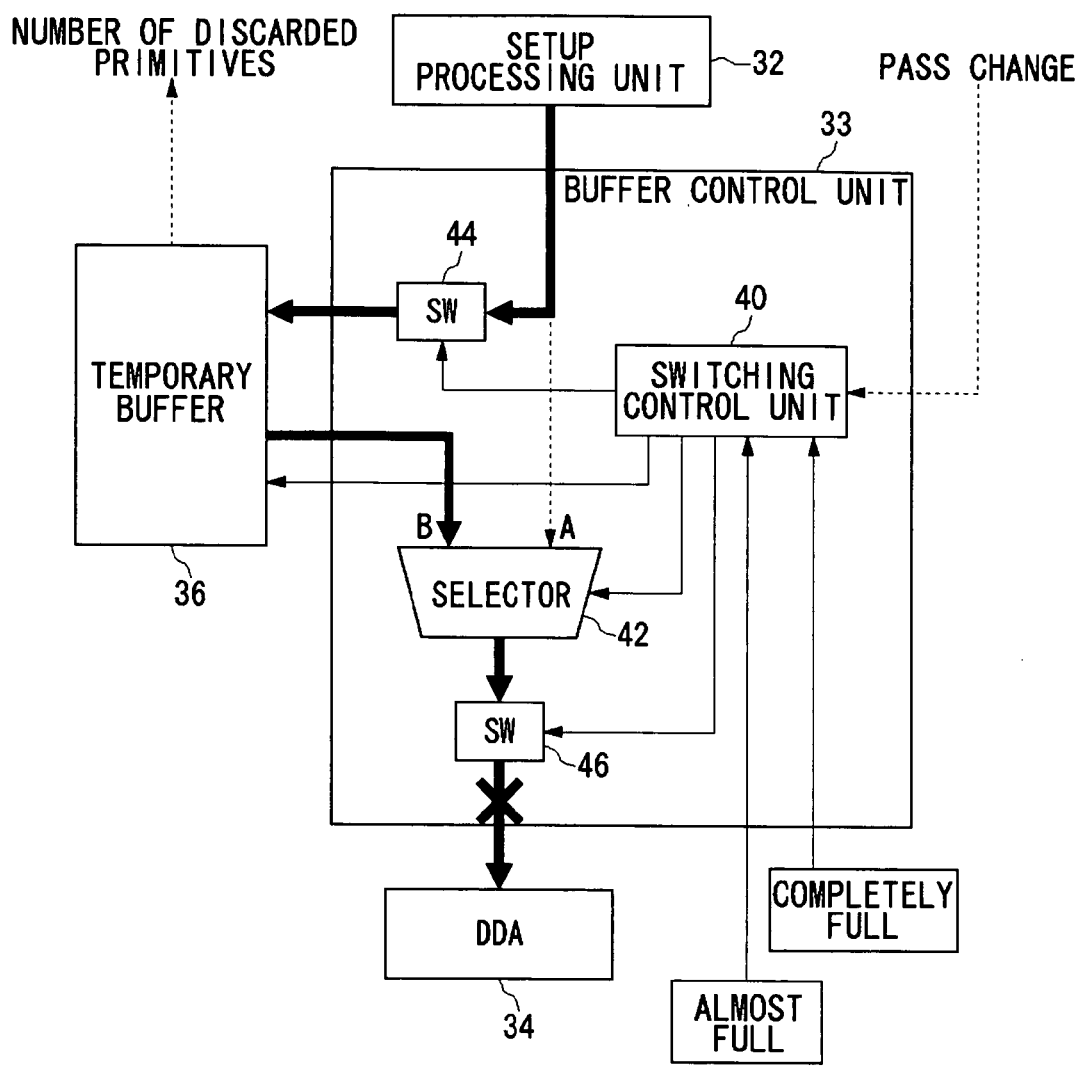
FIG. 10 shows exception handling operation performed by the buffer control unit of FIG. 3.

FIG. 10 shows the exception handling operation in steps SE10 through SE12 performed by the buffer control unit 33. The switching control unit 40 has received the "almost full" signal and the "completely full" signal but has not received the "pass change" signal. The switching control unit 40 turns the first switch 44 on so as to buffer the rendering primitive in the first pass from the setup processing unit 32 in the temporary buffer 36. Since the switching control unit 40 has received the "completely full" signal, the rendering primitive data in the first pass cannot be supplied to the DDA 34 any more. Therefore, the switching control unit 40 turns the second switch 46 off so as to prevent the rendering primitive data in the first pass retrieved from the temporary buffer 36 in the FIFO order from being input to the DDA 34.

Described above is the process for switching from the first pass to the second pass, including the exception handing operation. Referring back to FIG. 4, a description will be given of the process in the second and subsequent passes after the pass switching process in step S22.

A rendering primitive stream in the second pass is input to the setup processing unit 32 (S24). The setup processing unit 32 performs the setup process on rendering primitives in the second pass (S26). Step S22 and step S26 proceed while the pass switching process of step S22 is still being executed.

The DDA 34 determines whether the rendering primitive in the second pass supplied from the setup processing unit 32 is the last rendering primitive to be processed (S28). This determination is required because the process in the first pass is suspended at a pixel position in the middle of a rendering primitive and it is necessary to suspend the process in the second pass at the same pixel position in the same rendering primitive. If it is determined that the last rendering primitive is supplied (Y in S28), the DDA 34 subjects to the DDA process the rendering primitive until it arrives at the same pixel position as where the suspension occurred in the first pass (S32). If it is determined that the rendering primitive supplied is not the last rendering primitive (N in S28), the DDA 34 completes the DDA process on that rendering primitive.

The shader 20 performs the shading process in the second pass based on the pixel data generated by the DDA 34 (S34). If the processes have not been completed in all passes (N in S36), control is returned to step S24, whereupon the processes in the third and subsequent passes are performed in step S24 through step S34 similarly as described above.

The setup processing unit 32 is fed with only as many rendering primitives in the second pass as the number of rendering primitives in the first pass for which the process is completed. Therefore, rendering primitives in the second pass are not discarded when switching from the second pass to the third pass occurs. Accordingly, the supply of rendering primitives in the second pass and the supply of rendering primitives in the third pass can proceed one after another. In the second and subsequent passes, the supply of rendering primitives output from the setup processing unit 32 to the DDA 34 may be according to the direct supply operation that does not use the temporary buffer 36 or the indirect supply operation that uses the temporary buffer 36.

When the processes are completed for all passes (Y in S36), the DDA 34 updates the position of resumption of the DDA process by copying the position of suspension of the DDA process to the position of resumption (S38). When there still remains a rendering primitive to be subject to the multipass rendering process (N in S40), control is returned to step S12, whereupon the process in the first pass, switching to the second pass and the process in the second and subsequent passes are repeated similarly as described. When all rendering primitives to be subject to multipass rendering have been processed (Y in S40), multipass rendering is terminated.

Figure 11:
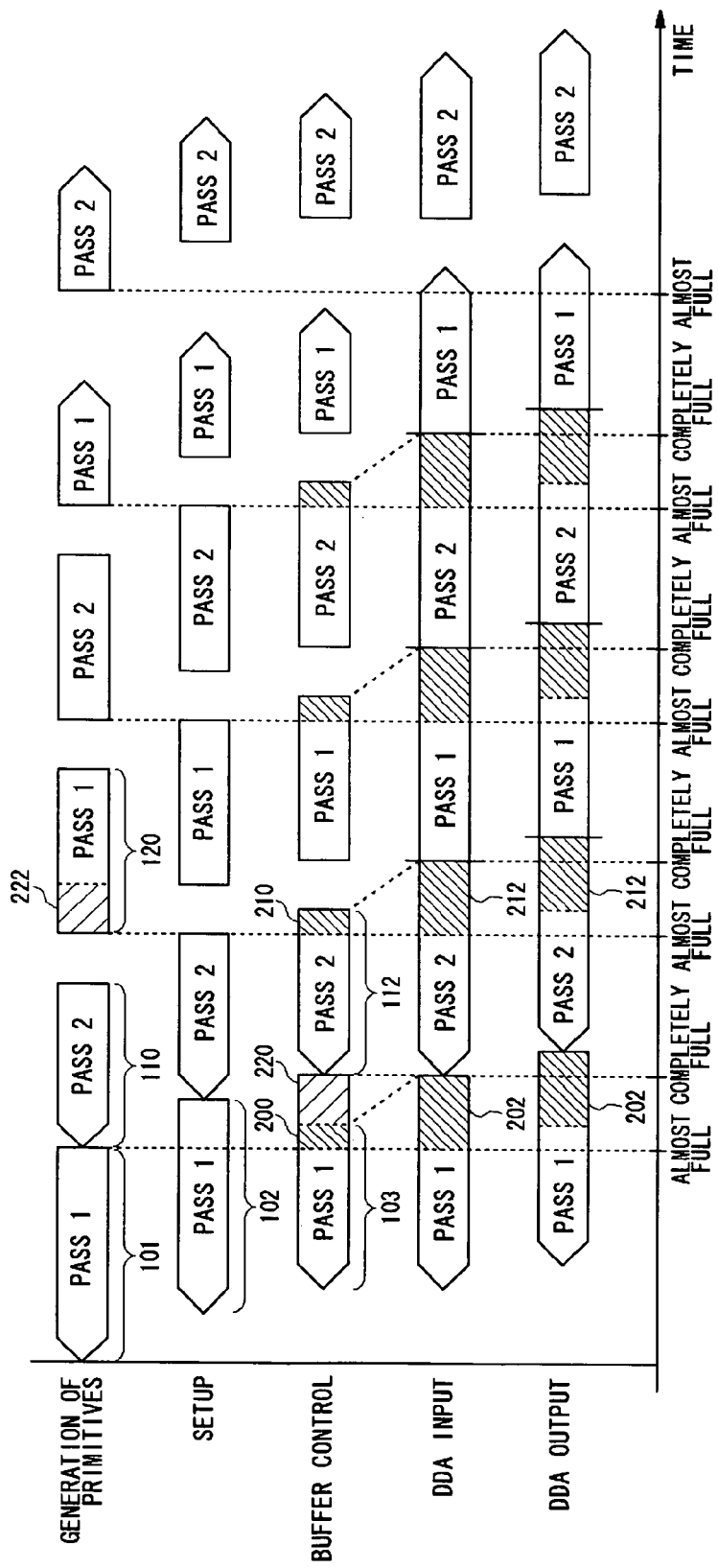
FIG. 11 is a timing chart for multipass rendering according to the embodiment.

FIG. 11 is a timing chart for multipass rendering. In this example, the shading process is divided into two passes. Illustrated is the flow of data in the first pass and the second pass occurring as the generation of rendering primitives, setup process, buffer control, input to the DDA, output from the DDA are performed in the stated order, the horizontal axis being time.

The primitive generating unit 90 continues to generate rendering primitives in the first pass until it receives the "almost full" signal from the shader 20, generating as many rendering primitives as indicated by reference numeral 101. The rendering primitives thus generated are converted into a stream by the primitive input unit 30 and input to the setup processing unit 32. The setup processing unit 32 sets up the input rendering primitives in the first pass as indicated by reference numeral 102.

The rendering primitives in the first pass thus set up are supplied to the buffer control unit 33 as indicated by reference numeral 103. Upon receiving the "completely full" signal from the shader 20, the DDA 34 suspends the DDA process on the rendering primitives in the first pass. The buffer control unit 33 discards the rendering primitives in the first pass which remain in the temporary buffer 36. Those of the rendering primitives in the first pass supplied to the buffer control unit 33 indicated by reference numeral 220 remain unprocessed in the temporary buffer 36 and is discarded. Those indicated by reference numeral 200 are buffered in the temporary buffer 36 subsequent to the "almost full" signal and are input to the DDA 34 via the temporary buffer 36. As a result of being pixelized in the DDA 34, the volume of data is increased as indicated by reference numeral 202.

The primitive generating unit 90 determines the number of rendering primitives in the first pass processed without being discarded, by subtracting the number of discarded rendering primitives from the number of initially input rendering primitives in the first pass. In generating rendering primitives in the second pass, the primitive generating unit 90 has to generate only as many rendering primitives as the determined number of rendering primitives in the first pass, as indicated by reference numeral 110. That is, the number of rendering primitives in the second pass indicated by reference numeral 110 is equal to the number of rendering primitives in the first pass not discarded indicated by reference numeral 103.

As indicated by reference numeral 112, the rendering primitives in the second pass are supplied to the buffer control unit 33 after being subjected to the setup process. After the "almost full" signal is received from the shader 20, the rendering primitives in the shaded area indicated by reference numeral 210 are buffered in the temporary buffer 36 and input to the DDA 34 via the temporary buffer 36. As a result of being pixelized in the DDA 34, the volume of data is increased as indicated by reference numeral 212.

The rendering primitives in the second pass buffered in the temporary buffer 36 after the "almost full" signal is received are all supplied to the DDA 34. Since none of the rendering primitives are discarded, no waste is generated.

When the primitive generating unit 90 receives the second "almost full" signal from the shader 20, it is found that the process through the second pass is completed. Thereupon, control is returned to the first pass so that the generation of rendering primitives is resumed as indicated by reference numeral 120. The portion indicated by reference numeral 222 corresponds to the number of rendering primitives discarded from the temporary buffer 36 in the initial process in the first pass. The discarded portion is shown here because it is necessary to go back a number of steps commensurate with the number of discarded rendering primitives to resume the process in the first pass. Thereafter, the setup process, buffer control and DDA process in the first pass proceed for the second time as in the initial process in the second pass. The second process in the second pass also proceeds as described.

The timing charts for DDA input and DDA output reveal that the pixel data of rendering primitives in the first pass and the second pass are subject to the DDA process one after another without creating any interruption. In this example, all rendering primitives have been processed after the third process in the first and second passes, thus completing multipass rendering.

As described above, according to the embodiment, overhead accompanying pass switching is eliminated by switching from the first pass to the second pass using a temporary buffer. Consequently, it is ensured that rasterization proceeds continuously, thereby improving processing performance in multipass rendering.

Described above is an explanation based on the embodiment. The embodiment is only illustrative in nature and it will be obvious to those skilled in the art that variations in constituting elements and processes are possible within the scope of the present invention. Some such variations will be described.

In the described embodiment, the primitive generating unit 90 is provided outside the rasterizer 10 as a structure separate from the primitive input unit 30 in the rasterizer 10. Alternatively, the primitive input unit 30 in the rasterizer 10 may be provided with all or some of the functions of the primitive generating unit 90. For example, the primitive input unit 30 may be provided with the function of suspending and resuming the generation of rendering primitive stream data. The shader 20 may be designed to supply the "almost full" signal to the primitive input unit 30 so that the primitive input unit 30 performs pass switching in response to the "almost full" signal.

In the described embodiment, the result of operation by the shader 20 in an immediately preceding pass is fed back and used in the operation in an immediately following pass. If the intermediate result is used in two or more passes ahead (as in the case where the operation result in the first pass is used in the third or subsequent pass), a buffer area capable of holding data that does not depend on frame position may be provided in the frame buffer 50 so that the buffer area may store the intermediate result from the preceding pass and the following pass may read the intermediate result from the buffer area for processing. Multipass rendering according to the embodiment ensures also in this case that rasterization of rendering primitives in the following pass is performed without creating interruption at the time of pass switching. Accordingly, it is possible to perform an operation that uses an intermediate result from a pass preceding a current pass by two or more stages, equally as efficiently as a normal operation.

What is claimed is:

1. A rendering processor for multipass rendering in which a rendering process on rendering primitives are divided into a plurality of operation passes, comprising:
    a primitive generating unit which generates data related to the rendering primitives processed in each of the operation passes in multipass rendering;
    a rasterizer which rasterizes the data related to the rendering primitives in each of the operation passes and input from the primitive generating unit so as to sequentially generate pixel data; and
    a shader which processes the pixel data by executing an instruction in each of the operation passes using a pipeline process, wherein
    the shader supplies a pass switching signal to the primitive generating unit with a time margin before first pixel data in a current operation pass arrives at a final stage of the pipeline process, and
    the primitive generating unit is prompted by the receipt of the pass switching signal to suspend the generation of the data related to the rendering primitives in the current operation pass and starts generating the data related to the rendering primitives in a next operation pass.

2. The rendering processor according to claim 1, wherein the time margin is set in accordance with time required between the start of generation of the rendering primitives by the primitive generating unit and the input of the rendering primitives to rasterization by the rasterizer.

3. The rendering processor according to claim 1, wherein the rasterizer includes a digital differential analyzer for transforming the data related to the rendering primitives into the pixel data by digital differential analysis, and wherein the time margin is set in accordance with time required between the start of generation of the rendering primitives by the primitive generating unit and a point of time immediately before the rendering primitives are input to digital differential analysis by the digital differential analyzer.

4. The rendering processor according to claim 1, wherein a number of remaining stages in the pipeline process counted from the final stage of the pixel pipeline process is determined in accordance with the time margin, and the shader supplies the pass switching signal to the primitive generating unit when the first pixel data in the current operation pass arrives at a position removed from the final stage of the pipeline process by the number of remaining stages.

5. The rendering processor according to claim 1, wherein the shader supplies, to the rasterizer, a pixel input suspension signal for suspending the input of the pixel data in the current operation pass when the first pixel data in the current operation pass arrives at the final stage of the pipeline process, and the rasterizer is prompted by the receipt of the pixel input suspension signal to suspend rasterizing the data related to the rendering primitives being processed in the current operation pass and to switch to rasterization of the data related to the rendering primitives to be processed in the next operation pass.

6. The rendering processor according to claim 5, wherein the rasterizer includes a temporary buffer for temporarily holding the data related to the rendering primitives input from the primitive generating unit, the shader also supplies the pass switching signal to the rasterizer, and the rasterizer rasterizes the data related to the rendering primitives in the current operation pass, buffering the data in the temporary buffer, in a period between the receipt of the pass switching signal and the receipt of the pixel input suspension signal.

7. The rendering processor according to claim 6, wherein the rasterizer discards the data related to the rendering primitives in the current operation pass that remain in the temporary buffer when the rasterizer receives the pixel input suspension signal and rasterizes the data related to the rendering primitives in the next operation pass without buffering the data in the temporary buffer.

8. The rendering processor according to claim 7, wherein the rasterizer informs the primitive generating unit of the number of rendering primitives in the current operation pass discarded from the temporary buffer, and the primitive generating unit goes back a number of steps commensurate with the number of discarded rendering primitives before resuming a process in the current operation pass to generate the data related to the rendering primitives and inputting the same to the rasterizer.

9. A rasterizer for rasterizing data related to rendering primitives for multipass rendering in which a rendering process on the rendering primitives are divided into a plurality of operation passes, rasterization proceeding in each of the operation passes, comprising:
   a setup processing unit which sets up parameters related to digital differential analysis for the data related to the rendering primitives in each of the operation passes;
   a temporary buffer which temporarily holds the data related to the rendering primitives output from the setup processing unit;
   a digital differential analyzer which transforms the data related to the rendering primitives into pixel data by referring to the parameters related to digital differential analysis; and
   a buffer control unit which switches between indirect supply using the temporary buffer and direct supply bypassing the temporary buffer, for supply of the data related to the rendering primitives from the setup processing unit to the digital differential analyzer.

10. The rasterizer according to claim 9, wherein the buffer control unit suspends the supply of the data related to the rendering primitives being processed in the current operation pass to the digital differential analyzer and switches to the supply of the data related to the rendering primitives to be processed in the next operation pass to the digital differential analyzer, when the buffer control unit receives, from a shader performing a pipeline process on the pixel data generated by the rasterizer, a pixel input suspension signal for suspending the input of the pixel data in the current operation pass as a result of the first pixel data in the current operation pass arriving at a final stage of the pipeline process.

11. The rasterizer according to claim 10, wherein, when the buffer control unit receives, from the shader performing the pipeline process on the pixel data generated by the rasterizer, a pass switching signal with a time margin before the arrival of the first pixel data in the current operation pass at the final stage of the pipeline process, the buffer control unit supplies the data related to the rendering primitives in the current operation pass to the digital differential analyzer, buffering the data in the temporary buffer, in a period of time between the receipt of the pass switching signal and the receipt of the pixel input suspension signal.

12. The rasterizer according to claim 11, wherein the buffer control unit discards the data related to the rendering primitives in the current operation pass that remain in the temporary buffer when the buffer control unit receives the pixel input suspension signal and supplies the data related to the rendering primitives in a next operation pass to the digital differential analyzer without buffering the data in the temporary buffer.

13. A rendering method for rasterizing data related to rendering primitives for multipass rendering in which a rendering process on the rendering primitives are divided into a plurality of operation passes, rasterization proceeding in each of the operation passes, comprising:
   setting up parameters related to digital differential analysis for the data related to the rendering primitives in each of the operation passes; and
   pixelizing the rendering primitives by referring to the parameters related to digital differential analysis, wherein
   when switching between operation passes, the data related to the rendering primitives in the current operation pass is buffered in a temporary buffer before being pixelized, the buffer data is retrieved in the FIFO order from the temporary buffer, and the retrieved data is sequentially pixelized until the parameters related to digital differential analysis for the first rendering primitive in a next operation pass has been set up, and
   when not switching between operation passes, the data related to the rendering primitives in the current operation pass is pixelized while bypassing the temporary buffer.

14. The rendering method according to claim 13, wherein, at the time of switching between operation passes, the data related to the rendering primitives in the current operation pass buffered is discarded and the data related to the rendering primitives in the next operation pass is pixelized without being buffered, when the parameters related to digital differential analysis for the data related to the first rendering primitive in the next operation pass has been set up.

* * * * *

UNITED STATES PATENT AND TRADEMARK OFFICE
CERTIFICATE OF CORRECTION

PATENT NO. : 7,616,211 B2  Page 1 of 1
APPLICATION NO. : 11/302534
DATED : November 10, 2009
INVENTOR(S) : Junichi Naoi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 657 days.

Signed and Sealed this

Nineteenth Day of October, 2010

David J. Kappos
*Director of the United States Patent and Trademark Office*